United States Patent
Maeda et al.

(10) Patent No.: US 7,500,061 B2
(45) Date of Patent: Mar. 3, 2009

(54) PRELOAD CONTROLLER, PRELOAD CONTROL METHOD FOR CONTROLLING PRELOAD OF DATA BY PROCESSOR TO TEMPORARY MEMORY, AND PROGRAM

(75) Inventors: Seiji Maeda, Kawasaki (JP); Yusuke Shirota, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 284 days.

(21) Appl. No.: 11/151,344

(22) Filed: Jun. 14, 2005

(65) Prior Publication Data

US 2006/0004966 A1 Jan. 5, 2006

(30) Foreign Application Priority Data

Jun. 30, 2004 (JP) .............................. 2004-194372

(51) Int. Cl.
*G06F 12/00* (2006.01)
(52) U.S. Cl. ..................... 711/137; 711/204; 712/207; 710/15; 710/34
(58) Field of Classification Search .................. 711/137
See application file for complete search history.

(56) References Cited

U.S. PATENT DOCUMENTS

| | | | | |
|---|---|---|---|---|
| 5,940,876 | A * | 8/1999 | Pickett | 711/220 |
| 6,012,106 | A * | 1/2000 | Schumann et al. | 710/22 |
| 6,401,192 | B1 * | 6/2002 | Schroter et al. | 711/137 |
| 6,636,945 | B2 * | 10/2003 | Nakamura | 711/137 |
| 6,918,010 | B1 * | 7/2005 | Yeager | 711/137 |
| 6,981,099 | B2 * | 12/2005 | Paulraj et al. | 711/137 |
| 7,177,985 | B1 * | 2/2007 | Diefendorff | 711/137 |
| 2004/0205298 | A1 * | 10/2004 | Bearden et al. | 711/137 |
| 2004/0268050 | A1 * | 12/2004 | Cai et al. | 711/137 |

FOREIGN PATENT DOCUMENTS

JP 2002-297379 10/2002

OTHER PUBLICATIONS

Ahmed H.M.R. El-Mahdy, "A Vector Architecture for Multimedia Java Applications", 2001, Section 7.3, Fig 8.3, Section 9.2, and 9.2.2. http://www.cs.man.ac.uk/~elmahdya/thesis/Title.html.*
Kandiraju et al."Going the distance for TLB Prefetching: An Application-driven Study", 2002, IEEE.*
John L. Hennessy, et al., "Memory Hierarchy Design", Computer Architecture: A Quantitative Approach, Chapter 5, Sections 1-5, 2003, pp. 390-435 and 4 coverpages.
Ahmed H.M.R. El-Mahdy. "A Vector Architecture for Multimedia Java Applications." [on-line], The University of Manchester, 2001, pp. 112-124, 138-152.

* cited by examiner

*Primary Examiner*—Kevin L Ellis
*Assistant Examiner*—Kalpit Parikh
(74) *Attorney, Agent, or Firm*—Oblon, Spivak, McClelland, Maier & Neustadt, P.C.

(57) ABSTRACT

A preload controller for controlling a bus access device that reads out data from a main memory via a bus and transfers the readout data to a temporary memory, including a first acquiring device to acquire access hint information which represents a data access interval to the main memory, a second acquiring device to acquire system information which represents a transfer delay time in transfer of data via the bus by the bus access device, a determining device to determine a preload unit count based on the data access interval represented by the access hint information and the transfer delay time represented by the system information, and a management device to instruct the bus access device to read out data for the preload unit count from the main memory and to transfer the readout data to the temporary memory ahead of a data access of the data.

16 Claims, 11 Drawing Sheets

Access hint information table 202

| ID | Start address | Access unit [byte] | Stride [byte] | Access interval [cycle] | Access data count |
|----|---------------|---------------------|----------------|--------------------------|---------------------|
| 1 | 0x00004000 | 4 | 16 | 400 | 1024 |
| 2 | 0x00008000 | 4 | 16 | 400 | 1024 |
| 3 | 0x00010000 | 8 | 32 | 1000 | 4096 |
| 4 | 0x00020000 | 8 | 32 | 1000 | 4096 |

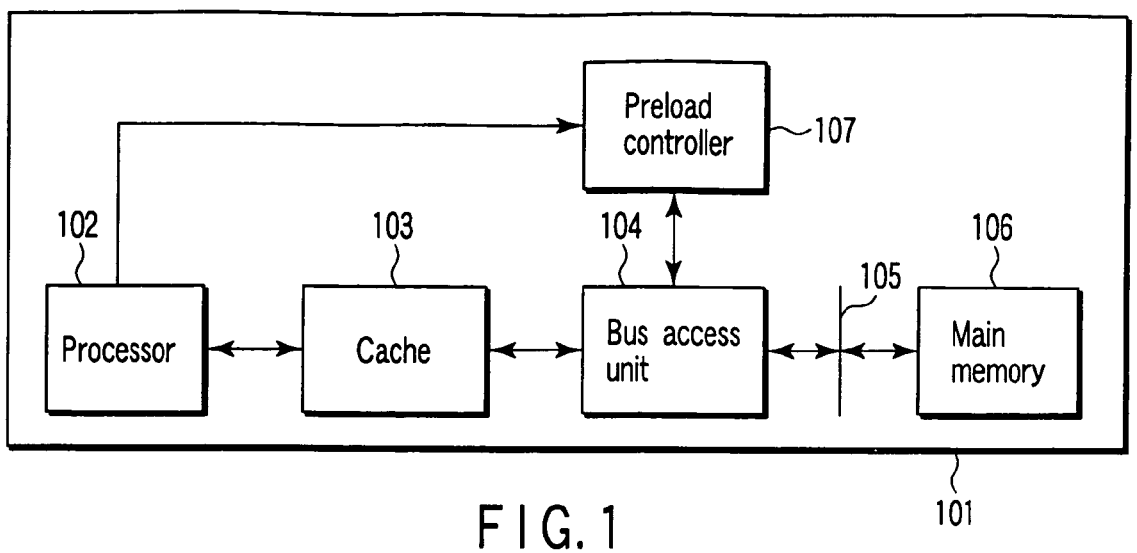
FIG. 1
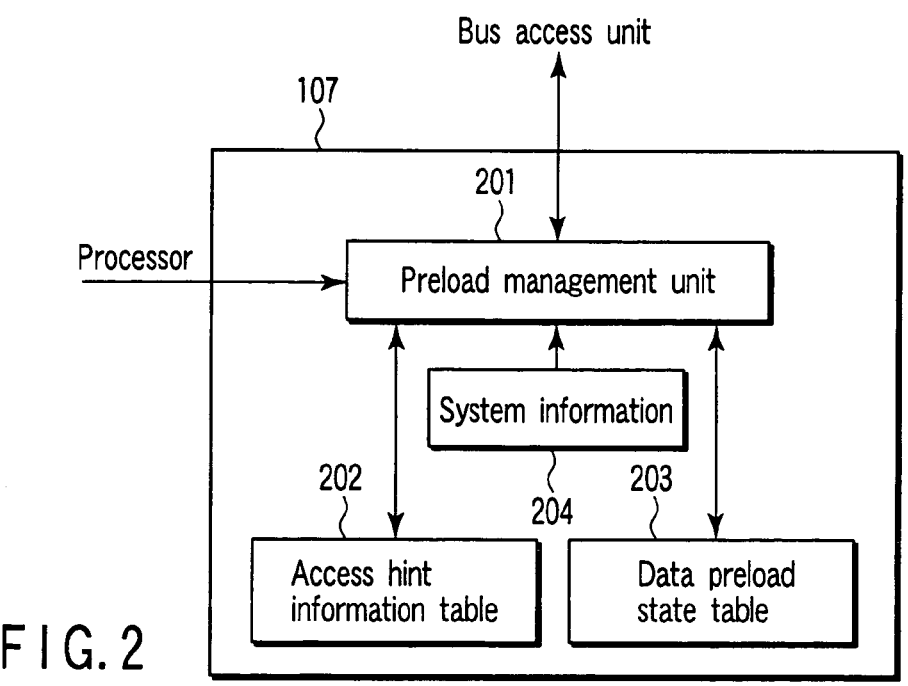
FIG. 2
Access hint information
| ID | Start address | Access unit [byte] | Stride [byte] | Access interval [cycle] | Access data count |
|---|---|---|---|---|---|
| 1 | 0x00004000 | 4 | 8 | 400 | 1024 |
FIG. 3

202
Access hint information table
| ID | Start address | Access unit [byte] | Stride [byte] | Access interval [cycle] | Access data count | |
|---|---|---|---|---|---|---|
| 1 | 0x00004000 | 4 | 16 | 400 | 1024 | 401 |
| 2 | 0x00008000 | 4 | 16 | 400 | 1024 | 402 |
| 3 | 0x00010000 | 8 | 32 | 1000 | 4096 | |
| 4 | 0x00020000 | 8 | 32 | 1000 | 4096 | |
F I G. 4
203
Data preload state table
| ID | Preload target address | Access unit [byte] | Stride [byte] | Preload unit count | Remaining preload data count | |
|---|---|---|---|---|---|---|
| 1 | 0x00004080 | 4 | 16 | 8 | 1016 | 501 |
| 2 | 0x0000a000 | 4 | 16 | 512 | 512 | 502 |
F I G. 5
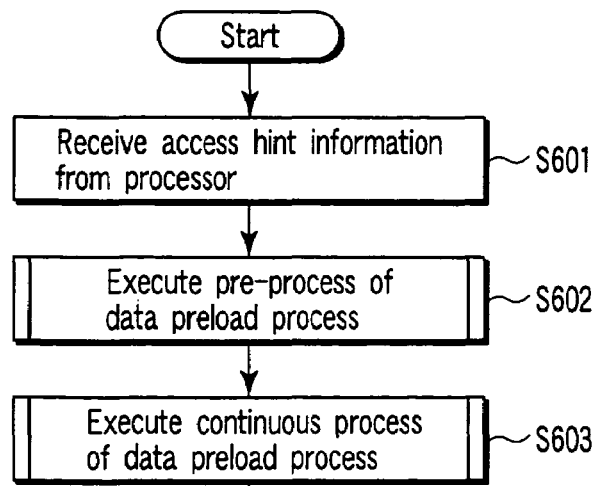
F I G. 6

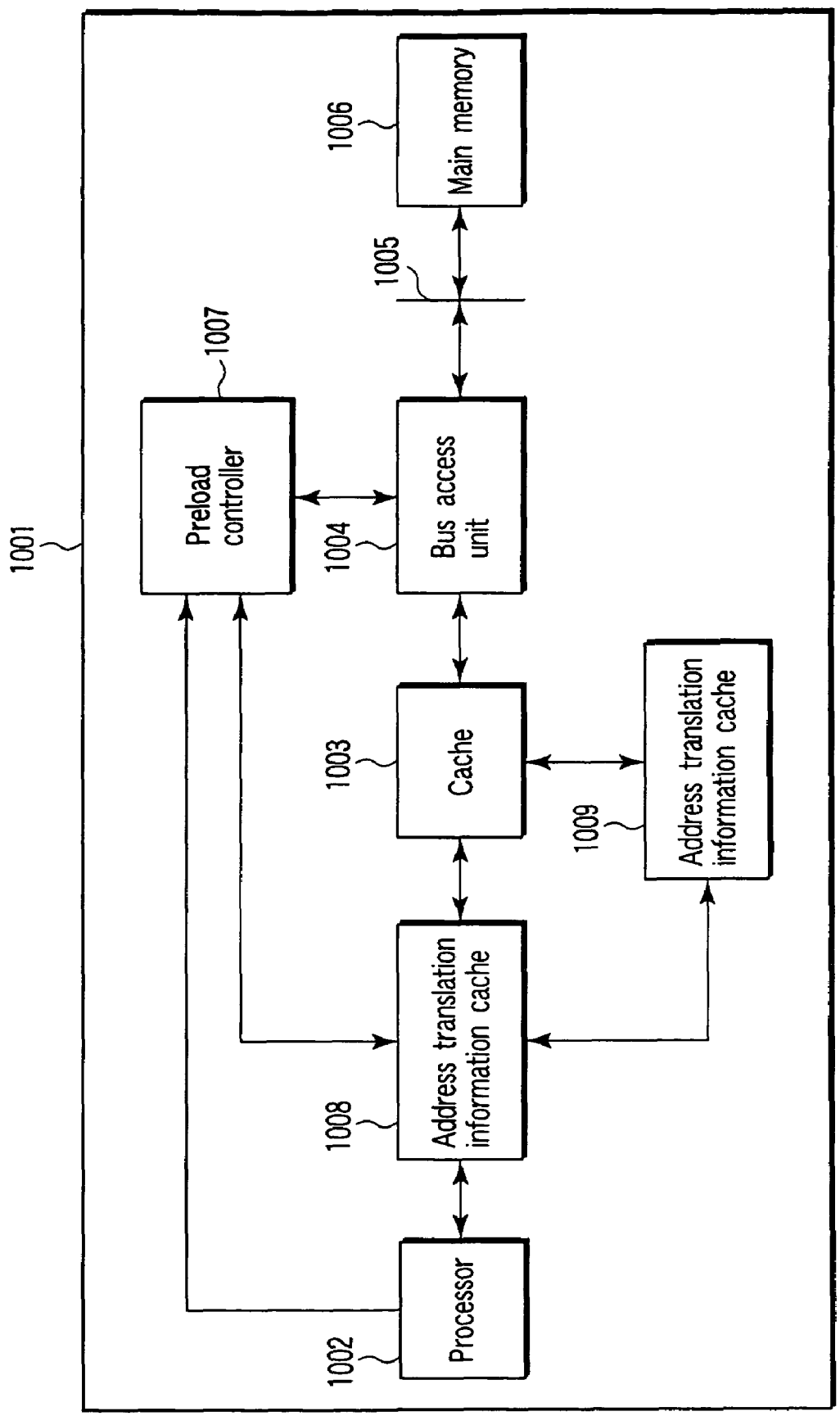
F I G. 10

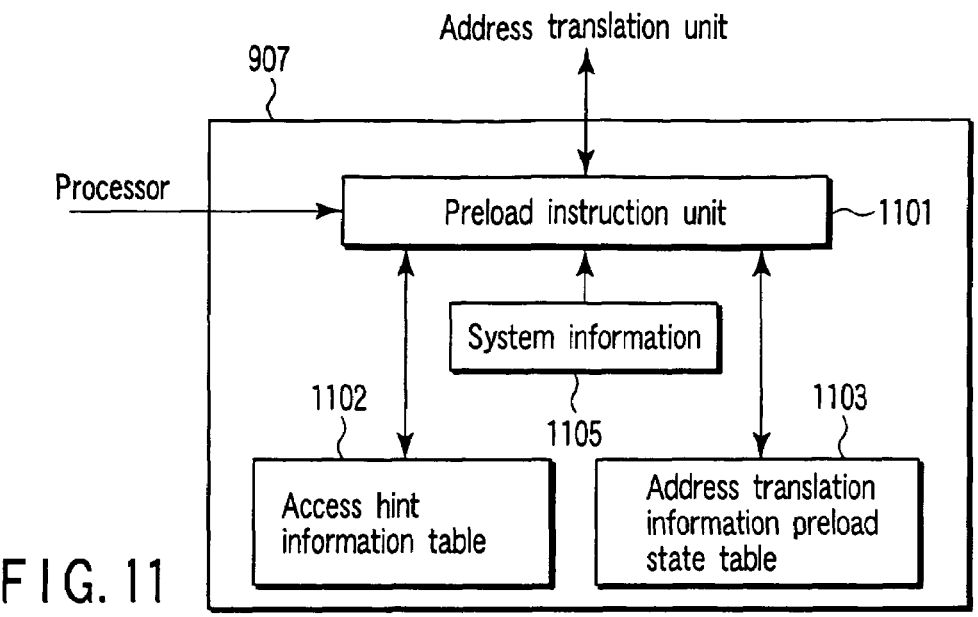
FIG. 11
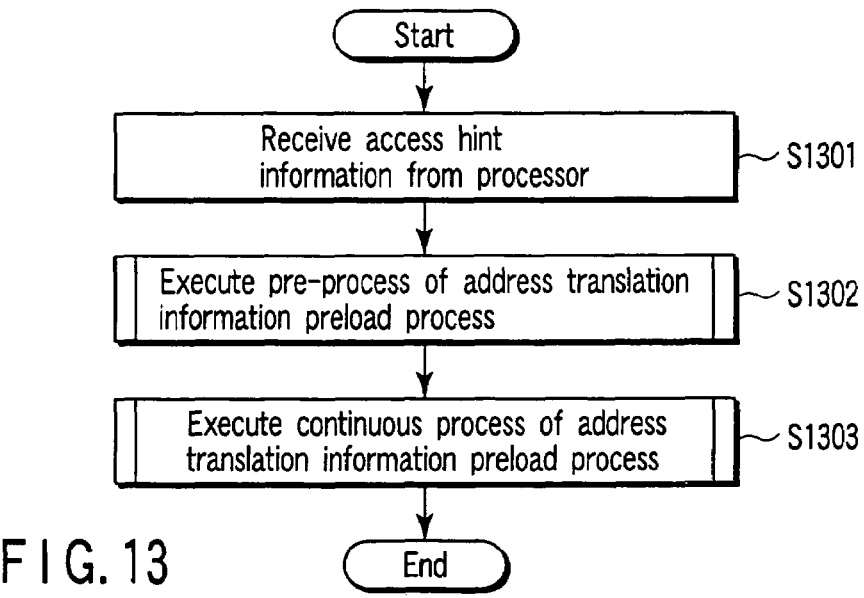
| 1103 | Address translation information preload state table | | | | |
|---|---|---|---|---|---|
| ID | Preload target address | Stride [byte] | Preload unit count | Remaining preload information count | |
| 1 | 0x00005000 | 0x1000 | 1 | 3 | ~1201 |
| 2 | 0x0000a000 | 0x1000 | 1 | 2 | ~1202 |
FIG. 12
FIG. 13

PRELOAD CONTROLLER, PRELOAD CONTROL METHOD FOR CONTROLLING PRELOAD OF DATA BY PROCESSOR TO TEMPORARY MEMORY, AND PROGRAM

CROSS-REFERENCE TO RELATED APPLICATIONS

This application is based upon and claims the benefit of priority from prior Japanese Patent Application No. 2004-194372, filed Jun. 30, 2004, the entire contents of which are incorporated herein by reference.

BACKGROUND OF THE INVENTION

1. Field of the Invention

The present invention relates to a computer system, a preload controller and method for controlling a preload access of data to a temporary memory, and a program.

2. Description of the Related Art

The performance of a processor that makes arithmetic processes has been rapidly improving along with the advance of the internal structure of pipeline processes, and the advance of the semiconductor techniques. By contrast, the improvement of the performance of a main memory that stores data used in the arithmetic processes falls behind that of the processor in terms of the data supply speed, and the data supply speed to the processor has not caught up with the arithmetic processing speed. For this reason, many computer systems normally comprise a temporary memory of data called a "cache" so as to absorb the speed difference between the processor and main memory device.

The cache is a device which requires higher manufacturing cost per circuit scale than the main memory, but has a higher data supply speed than that of the main memory and is indispensable to bring out the arithmetic processing performance of the processor.

When an access (read request) to data stored in the main memory device occurs, the cache is referred to in place of the main memory device. At this time, if requested data is cached, the data is read out from the cache and is sent to the processor. On the other hand, if the requested data is not cached, the requested data is transferred from the main memory to the cache via a system bus, and is then supplied to the processor. The reason why the data is transferred to the cache first is to prepare for the next access to identical data. A ratio indicating if data is cached when an access to the data stored in the main memory occurs is called a cache hit ratio. The cache hit ratio is one of the parameters that reflect the performance of the cache.

In recent years, requirements for the cache performance become stricter. Especially, such trend is conspicuous in the application fields that process data in large quantities at high speed such as science technology calculations, multimedia processes, and the like. As described above, since the cache requires high cost, the storage size of the cache must be reduced in terms of cost. Inevitably, the use of the cache is limited to temporary storage of data. Therefore, the required data is not always cached. For example, if data associated with an access request is not always cached, i.e., if the cache hit ratio is too low, the data supply speed lowers to the same level as that when no cache is provided.

Conventionally, the cache performance is improved by adding a new scheme for making a so-called "preload" process for reading out data required for a process onto the cache in advance. Some implementation methods of the preload process are known; for example, (1) a method that uses a prefetch command, and (2) a method that predicts access patterns.

In the former method that uses a prefetch command, a prefetch command that specifies the address of data to be accessed is inserted onto a program. The prefetch command is a command for reading out data of the designated address onto the cache in advance. When the prefetch command is executed ahead of a command that uses data, the data is prefetched before the data is used actually, and is prepared on the cache in advance.

In the latter method that predicts access patterns, a future access pattern is predicted on the basis of past data access patterns (history), thus executing a preload process. When data accesses are continuously made on addresses (e.g., accesses to sequence data), the addresses of data to be accessed are monitored, thus predicting the address of next data to be accessed. According to this prediction result, the preload process of data which will be required in the future is executed. In the same manner as in the former method, when data is to be used actually, the data is prepared on the cache and is temporarily stored.

As described above, the performance can be improved by applying the preload scheme to the temporary storage, but the following problems are posed.

In the above described method (1) that inserts a prefetch command in a program, it is not practical to adjust and provide a program to cope with different performance levels of individual computer systems. Hence, a program must be inevitably optimized with reference to a given performance value. As a result, the performance difference among computer systems cannot be taken into consideration, and the degree of improvement in performance varies depending on the performance of computer systems.

In the above described method (2) based on prediction of access patterns, prediction has a limitation. For example, information such as which data access is important for a computation process, how many times that data access continues, and so forth cannot be predicted. In other words, there is an obvious bottleneck in regions other than access patterns that can be easily predicted.

BRIEF SUMMARY OF THE INVENTION

The present invention is directed to provide a preload controller and method for controlling a preload access of data to a temporary memory in a computer system, and a program, so as to contribute to stable and effective performance improvement.

According to one aspect of the present invention, there is provided a preload controller for controlling a bus access device that reads out data from a main memory via a bus and transfers the read out data to a temporary memory. The controller comprises a first acquiring device configured to acquire access hint information which represents a data access interval to the main memory; a second acquiring device configured to acquire system information which represents a transfer delay time in transfer of data via the bus by the bus access device; a determining device configured to determine a preload unit count based on the data access interval represented by the access hint information and the transfer delay time represented by the system information; and a management device configured to instruct the bus access device to read out data for the preload unit count from the main memory and to transfer the readout data to the temporary memory ahead of a data access of the data.

A preload controller according to another aspect of the present invention is a preload controller for controlling an address translation device which is connected to a main memory via a bus, reads out address translation information from the main memory via the bus, and transfers the readout address translation information to a temporary memory. The controller comprises a first acquiring device configured to acquire access hint information which represents a data access interval to the main memory; a second acquiring device configured to acquire system information which represents a transfer delay time in transfer of address translation information via the bus by the address translation device; a determining device configured to determine a preload unit count on the basis of the data access interval represented by the access hint information and the transfer delay time represented by the system information; and a management device configured to instruct the address translation device to read out address translation information for the preload unit count from the main memory and to transfer the readout address translation information to the temporary memory ahead of address translation using the address translation information.

BRIEF DESCRIPTION OF THE SEVERAL VIEWS OF THE DRAWING

FIG. 1 is a block diagram showing a computer system according to the first embodiment of the present invention;

FIG. 2 is a block diagram of a preload controller shown in FIG. 1;

FIG. 3 shows an example of access hint information received from a processor;

FIG. 4 shows an example of an access hint information table;

FIG. 5 shows an example of a data preload state table;

FIG. 6 is a flowchart showing the overall procedure of a data preload process according to the first embodiment of the present invention;

FIG. 10 is a block diagram showing another computer system according to the second embodiment of the present invention;

FIG. 11 is a block diagram of a preload controller shown in FIG. 9;

FIG. 12 shows an example of an address translation information preload state table;

FIG. 13 is a flowchart showing the overall procedure of an address translation information preload process according to the second embodiment of the present invention;

DETAILED DESCRIPTION OF THE INVENTION

First Embodiment

Figure 7:
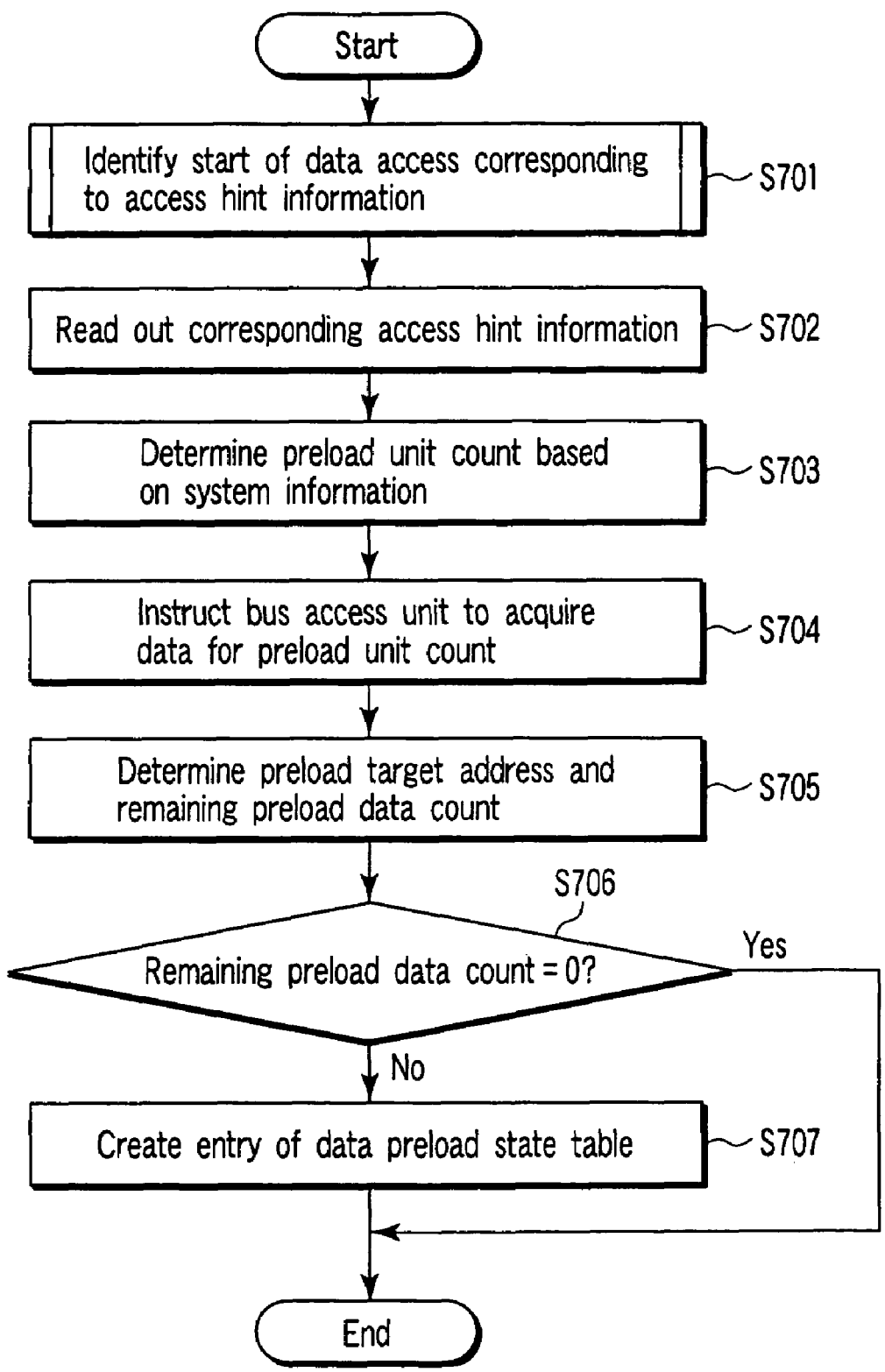
FIG. 7 is a flowchart pertaining to a pre-process of the data preload process in FIG. 6.

FIG. 1 is a block diagram showing a computer system according to the first embodiment of the present invention. A computer system 101 includes a processor 102, cache 103, bus access unit 104, bus 105, main memory 106, and preload controller 107. The processor 102 accesses the cache 103 to fetch data used in an arithmetic process. If required data is not cached, the cache 103 instructs the bus access unit 104 to transfer data. The bus access unit 104 transfers the designated data from the main memory 106 via the bus 105. The preload controller 107 controls a preload process on the basis of access hint information and system information obtained from the processor 102, and instructs the bus access unit 104 to transfer required data. The access hint information and system information will be described later.

Note that the bus access unit 104 may comprise a DMA controller for performing continuous data transfer.

A local memory, which has no data transfer function between the cache and main memory, may be used in place of the cache 103. The local memory is a high-speed memory as the cache 103, and its data supply speed is higher than that of the main memory. Since the local memory has no automatic data transfer function with the main memory, the circuit scale can be suppressed accordingly. However, ahead of a data access on the main memory, data transfer between the local memory and main memory must explicitly be instructed.

When the local memory is used in place of the cache 103, data transfer between the local memory and main memory 106 is done by the bus access unit 104 on the basis of an instruction from the processor 102 or preload controller 107.

FIG. 2 is a block diagram of the preload controller 107 shown in FIG. 1. The preload controller 107 has a preload management unit 201, access hint information table 202, data preload state table 203, and system information 204.

The preload management unit 201 executes a process for acquiring access hint information from the processor 102 and storing it in the access hint information table 202, and a process for acquiring the system information 204, and then executes a data preload process by identifying the start and end of an access to data. The access hint information table 202 stores access hint information. The data preload state table 203 stores information associated with a data preload process, which is in progress.

The preload controller 107 may be implemented as software that executes a specific procedure by a processor different from the processor 102. Note that the preload controller 107 may be implemented as software that runs on the processor 102 in place of another processor.

FIG. 3 shows an example of access hint information received from the processor 102. Access hint information 301 includes an ID (identifier), start address, access unit, stride, access interval, and access data count in this embodiment. The ID is used to identify the access hint information. The start address represents an address at which access starts. The access unit represents the size of data to be accessed together per data access. The stride denotes an address interval between a given access unit and the next access unit. For example, if the start address is 0x4000 and the stride is 8, the first data is located at 0x4000, the next data is located at 0x4008, and the second next data is located at 0x4010. When a negative value is designated as the stride, an access is made in a decreasing direction of addresses from the start address. The access interval represents a time interval between a given access unit and the next access unit. As a unit of time, the access hint information 301 uses a clock count, but a time may be designated directly. The access data count represents the number of data accesses associated with this access hint information.

FIG. 4 shows an example of the access hint information table. The access hint information table stores a plurality of pieces of access hint information received from the processor 102. Each of entries 401, 402, and the like of the access hint information table 202 indicates individual access hint information, whose items are the same as those in the access hint information 301.

FIG. 5 shows an example of the data preload state table. The data preload state table 203 includes an ID, preload target address, access unit, stride, preload unit count, and remaining preload data count. An entry 501 of the data preload state table corresponds to the entry 401 of the access hint information table, and an entry 502 of the data preload state table corresponds to the entry 402 of the access hint information table. The entry 501 of the data preload state table indicates a state after eight preload accesses are completed, and the entry 502 of the data preload state table indicates a state after 512 preload accesses are completed.

The ID, access unit, and stride are copied from the corresponding entry of the access hint information table. Note that the access unit and stride may not be copied to the data preload state table. For example, the entry of the access hint information table may be retrieved using the ID, and the access unit and stride stored in that entry may be used.

The preload target address represents an address of data which is to undergo the next preload process. Since the entry 501 of the data preload state table indicates a state after eight preload accesses are completed, it gets ahead of the start address in the entry 401 of the access hint information table by 128 bytes (0x80 in hex) as the product of 16 bytes (stride) and 8. Likewise, the entry 502 of the data preload state table gets ahead of the start address of the entry 402 by 8192 bytes (0x2000 in hex).

The preload unit count is calculated by the preload management unit 201 on the basis of the corresponding access hint information and system information.

The remaining preload data count represents the remaining number of data which are to undergo a preload process. Since the entry 501 of the data preload state table indicates a state after eight preload accesses are completed, the remaining preload data count assumes a value obtained by decreasing 8 from the data access count in the entry 401 of the access hint information table. Likewise, the remaining preload data count in the entry 502 of the data preload state table assumes a value obtained by decreasing 512 from the data access count in the entry 402.

As for the system information, in the first embodiment of the present invention, the system information 204 indicates clocks of the processor 102 and a data transfer delay time of the bus access unit 104, and is used to compute the preload unit count (to be described later). The system information 204 reflects the performance of this computer system, and may be directly acquired from the processor 102, bus access unit 104, or the like, or may be acquired via an operating system or the like.

FIG. 6 is a flowchart showing the overall procedure of a data preload process according to the first embodiment of the present invention. The processor 102 notifies the preload controller 107 of the access hint information 301 in advance (step S601). In this case, the preload controller 107 receives the access hint information 301 and stores it in the access hint information table 202. Also, the preload controller 107 acquires the system information 204.

Next, a pre-process of the preload process is executed (step S602). In the pre-process of the preload process, identification of the start of the preload process, an entry addition process to the data preload state table 203, and the like are made.

After that, a continuous process of the preload process is executed (step S603). In the continuous process of the preload process, the end of a data access is identified, and the remaining data preload process is continued on the basis of the entry added to the data preload state table 203 prepared by the pre-process.

FIG. 7 is a flowchart pertaining to the pre-process of the preload process shown in FIG. 6. Initially, the start of a data access corresponding to information stored in the access hint information table 202 is identified (step S701). To identify the data access start, the processor 102 may notify the preload controller 107 of access start information appended with the ID or start address of the access hint information. Alternatively, a data transfer instruction to the bus access unit 104 may be monitored, and when that address is equal to the start address of the access hint information table 202, it may be identified that the corresponding access has started.

Corresponding access hint information is read out from the access hint information 202 (step S702). The preload unit count is determined on the basis of clocks of the processor 102 and the data transfer delay time of the bus access unit 104 (step S703). After the preload unit count is determined, a data acquisition instruction for the preload unit count from the start address is issued to the bus access unit 104 (step S704).

The preload target address is calculated from the start address and stride of the corresponding access hint information in accordance with the preload unit count, and the remaining preload data count is calculated from the data access count (step S705). It is checked if the remaining preload data count is zero (step S706). If the remaining preload data count is not zero, a new entry is added to the data preload state table 203 on the basis of the calculated preload start address, preload unit count, and remaining preload data count, and the access unit and stride of the corresponding access hint information (step S707).

Note that a practical calculation example of the preload unit count will be described. The preload unit count is given, for example, by:

$$\text{Preload unit count} = \frac{\text{Data transfer delay time}}{\text{Data access time}} \qquad (1)$$

As the data transfer delay time, that of the bus access unit 104 can be used. As the data access time, a value obtained by dividing the access interval of the access hint information by clocks of the processor 102 can be used. In addition, as the data access time, a method of obtaining the behavior of the processor 102 from a command sequence to be executed during a data access, and estimating a processing time, a method of estimating by multiplying the number of commands included in a command sequence and the average processing time, or the like may be used.

If a new entry is added to the data preload state table 203 in step S707 in the pre-process of the data preload process shown in FIG. 7, the continuous process of the data preload process is executed.

Figure 8:
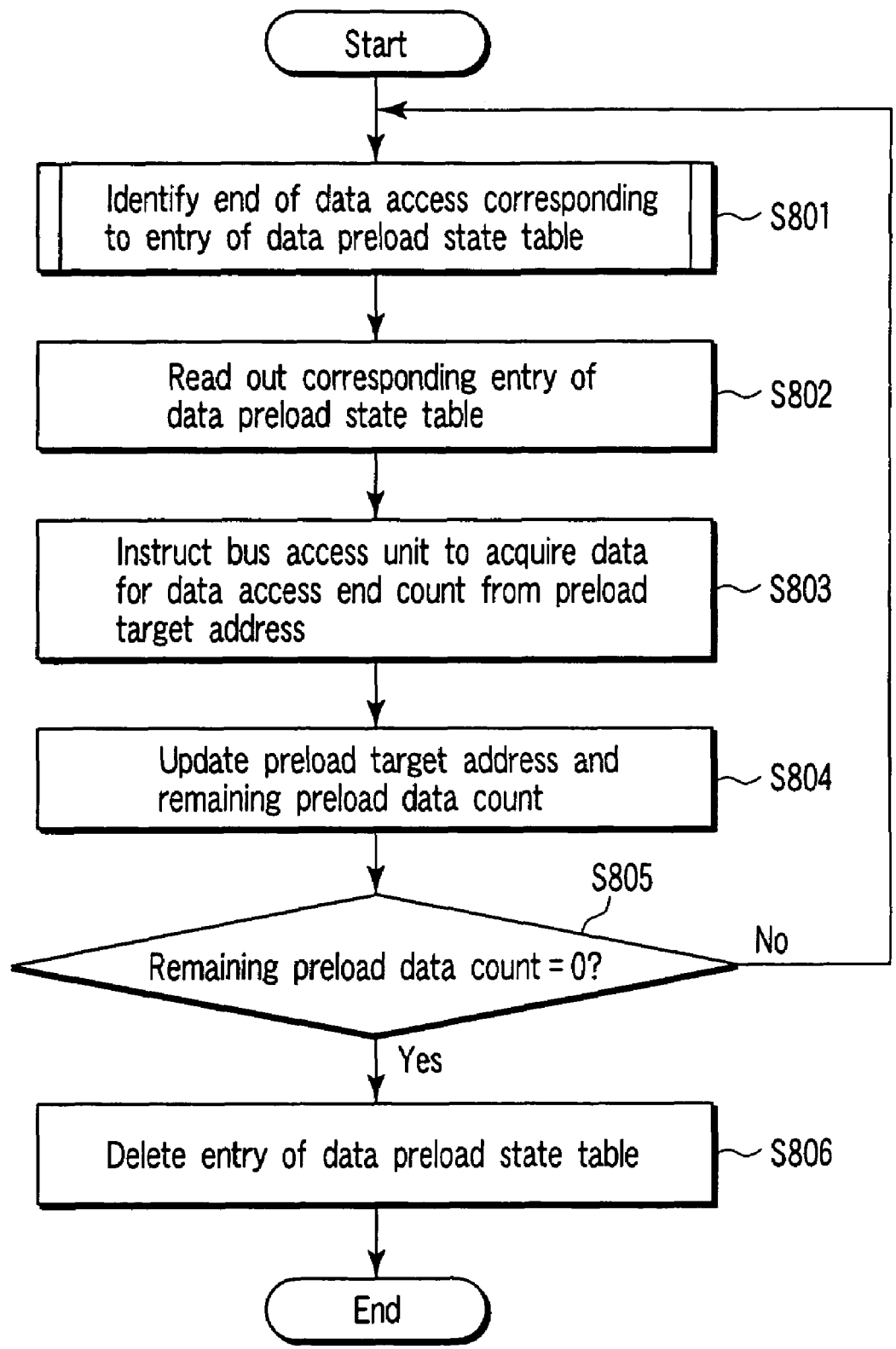
FIG. 8 is a flowchart pertaining to a continuous process of the data preload process in FIG. 6.

FIG. 8 is a flowchart pertaining to the continuous process of the data preload process in FIG. 6.

Initially, the end of a data access corresponding to the entry of the data preload state table is identified (step S801). To identify the data access end, the processor 102 may notify the preload controller 107 of access end information appended with the address of data, the access of which has ended. Alternatively, a data transfer instruction from the cache 103 to the bus access unit 104 may be monitored, and when that address is equal to the address of the preload instruction, it may be identified that the corresponding access has ended.

The corresponding entry of the data preload state table is read out (step S802), and data acquisition instructions for the data access end count from the preload target address of that entry are issued to the bus access unit 104 (step S803). Subsequently, the preload target address and remaining preload data count are updated in accordance with the number of preload instructions in step S803 (step S804). It is checked if the remaining preload data count becomes zero as a result of updating (step S805). If the remaining preload data count is not zero, the processes from step S801 are repeated; otherwise, the corresponding entry of the data preload state table 203 is deleted (step S806).

According to the first embodiment of the present invention described above, the preload controller performs a data preload process on the basis of the access hint information of data and system information, which are provided in advance, in consideration of the system performance and the like, and can allocate data required by the processor on the temporary memory (cache) in advance.

That is, since information associated with continuous data accesses in place of each individual data access is provided as the access hint information, the performance can be effectively improved by the preload process. Also, since the performance of the computer system is considered as the system information, such performance improvement is stable and has high flexibility.

Second Embodiment

The second embodiment of the present invention relates to preload access of address translation information. The present invention can be similarly applied to an address translation scheme in addition to temporary storage (cache) of data described in the first embodiment.

An overview of the address translation scheme will be explained first. In a multi-process method that simultaneously executes a plurality of programs on a computer system, a method of providing an identical address space to respective processes is normally used to facilitate development of programs used for respective processes. In this case, a virtual address space is provided to respective processes, and can be used as if a given process were occupying that address space. In a computer system that provides such function, an address translation unit such as a Memory Management Unit (MMU) is equipped to realize the virtual address space, and performs a translation process between the virtual address space and an actual (physical) address space of the computer system. This is called an "address translation process".

In the address translation process, address translation information indicating the relationship between the virtual address and actual (physical) address is used. It is a common practice to prepare the address translation information for each address translation unit such as a page size or the like. In this address translation unit, address translation is done using single address translation information.

Since the computer system uses address information in large quantities, such information may be stored on the main memory. All data accesses require address translation, and address translation information is required every access. However, the data access performance deteriorates if the address translation information is read out from the main memory for each access. Hence, address translation information is temporarily stored on a high-speed address translation information cache such as a Translation Look-aside Buffer (TLB) or the like, and the cached address translation information is used, thus implementing high-speed address translation.

The address translation information cache requires high cost per unit circuit area or the like as in the cache used for data compared to the main memory, but its data supply speed is higher than that of the main memory. Hence, the address translation information cache is indispensable to bring out the data access performance, and the arithmetic processing power of the processor depending on that performance.

In the second embodiment, a preload controller controls a preload process that considers the system performance and the like on the basis of access hint information of data and system information, which are provided in advance, so as to allocate address translation information required for the address translation unit on a temporary memory (address translation information cache) in advance.

Figure 9:
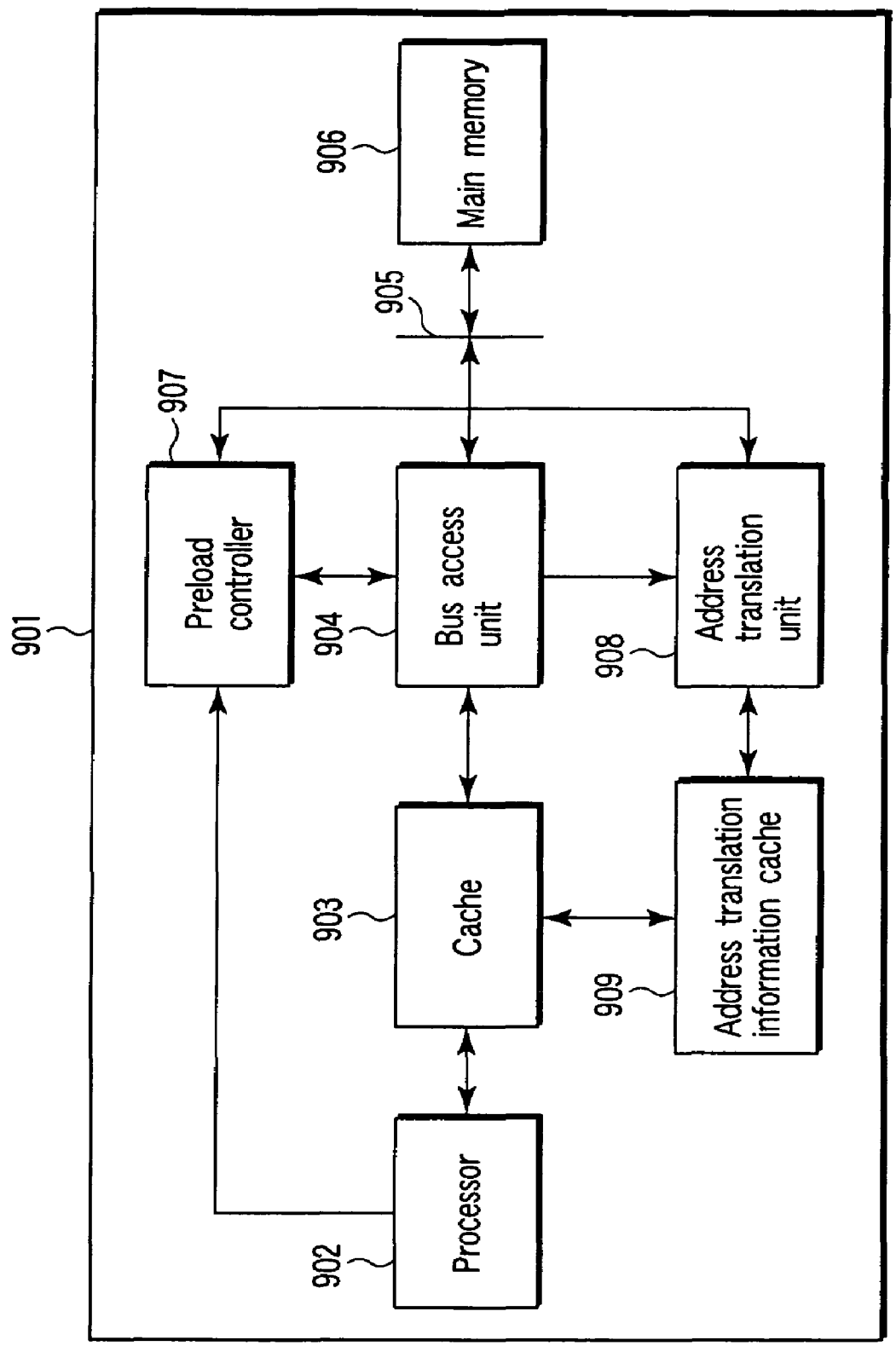
FIG. 9 is a block diagram showing a computer system according to the second embodiment of the present invention.

FIG. 9 is a block diagram showing a computer system according to the second embodiment of the present invention.

A computer system 901 includes a processor 902, cache 903, bus access unit 904, bus 905, main memory 906, preload controller 907, address translation unit 908, and address translation information cache 909.

The processor 902 accesses the cache 903 to fetch data used in an arithmetic process. If required data is not cached, the cache 903 instructs the bus access unit 904 to transfer data. The bus access unit 904 instructs the address translation unit 908 to translate the address of the designated data. The address translation unit 908 translates the address on the basis of information on the address translation information cache 909, and returns the result to the bus access unit 904. The bus access unit 904 transfers data from the main memory 906 via the bus 905 using the translated address. The preload controller 907 controls a preload process on the basis of access hint information and system information obtained from the processor 902, and instructs the address translation unit 908 to transfer required data.

Note that the bus access unit 904 may comprise a DMA controller for performing continuous data transfer.

A local memory which has no data transfer function between the cache and main memory may be used in place of the cache 903. In this case, data transfer between the local memory and main memory is done by the bus access unit 904 on the basis of an instruction from the processor 902 or preload controller 907.

In the computer system 901, the bus access unit 904 and preload controller 907 are connected, but they need not be connected.

FIG. 10 is a block diagram showing another computer system according to the second embodiment of the present invention. Unlike in the computer system shown in FIG. 9, the address translation information cache is inserted between the processor and cache.

A computer system 1001 includes a processor 1002, cache 1003, bus access unit 1004, bus 1005, main memory 1006, preload controller 1007, address translation unit 1008, and address translation information cache 1009.

The processor 1002 instructs the address translation unit 1008 to acquire data used in an arithmetic process. The address translation unit 1008 translates the address of the data using information on the address translation information cache 1009, and accesses the cache 1003 using the translated address. If required data is not cached, the cache 1003 instructs the bus access unit 1004 to transfer data. The bus access unit 1004 transfers data from the main memory 1006 via the bus 1005. The preload controller 1007 controls a preload process on the basis of access hint information and system information obtained from the processor 1002 and instructs transfer of address translation information required for the address translation unit 1008.

Note that the bus access unit 1004 may comprise a DMA controller for performing continuous data transfer.

A local memory which has no data transfer function between the cache and main memory may be used in place of the cache 1003. In this case, data transfer between the local memory and main memory is done by the bus access unit 1004 on the basis of an instruction from the processor 1002 or preload controller 1007.

In the computer system 1001, the bus access unit 1004 and preload controller 1007 are connected, but they need not be connected.

The address translation information preload processes using the computer systems 901 and 1001 have the same processing contents, and the preload controllers 907 and 1007 also have the same arrangement and processing contents. Hence, the following description will be given using the computer system 901.

FIG. 11 is a block diagram of the preload controller shown in FIG. 9. The preload controller 907 has a preload management unit 1101, access hint information table 1102, address translation information preload state table 1103, and system information 1105. The preload management unit 1101 executes a process for receiving access hint information from the processor 902 and storing it in the access hint information table 1102, and an address translation information preload process by identifying the start and end of an access to data. The access hint information table 1102 has the same configuration as the access hint information table 202, and stores access hint information. The address translation information preload state table 1103 stores information associated with an address translation information preload process, which is in progress.

The processing method of the preload controller 907 may be implemented as software by a processor different from the processor 902. Alternatively, the preload controller 907 may be implemented as software that runs on the processor 902.

The access hint information and access hint information table 1102 used in this embodiment use the access hint information and access hint information table 202 explained in the first embodiment.

FIG. 12 shows an example of the address translation information preload state table. The address translation information preload state table includes an ID, preload target address, stride, preload unit count, and remaining preload information count.

An entry 1201 of the address translation information preload state table of this embodiment corresponds to the entry 401 of the access hint information table, and an entry 1202 of the address translation information preload state table corresponds to the entry 402 of the access hint information table. The entry 1201 of the address translation information preload state table indicates a state after one preload access is completed, and the entry 1202 of the address translation information preload state table indicates a state after two preload accesses are completed.

The preload target address represents a pre-translation address of address translation information which is to undergo the next preload process. Since the entry 1201 of the address translation information preload state table indicates a state after one preload access is complete, it gets ahead of the start address in the entry 401 of the access hint information table by 0x1000 bytes as the product of 0x1000 bytes (stride) and 1. Likewise, the entry 1202 of the address translation information preload state table gets ahead of the start address of the entry 402 by 0x2000 bytes.

The stride and preload unit count are calculated by the preload management unit 1101 on the basis of the corresponding access hint information and system information.

The remaining preload information count represents the remaining number of pieces of address translation information, which are to undergo a preload process.

As for the system information, in the second embodiment of the present invention, the system information 1105 indicates an address translation unit, clocks of the processor 902, and a data transfer delay time of the bus access unit 904, and is used to compute the stride and preload unit count (to be described later). The system information 1105 reflects the performance of this computer system, and may be directly acquired from the processor 902, bus access unit 904, or the like, or may be acquired via an operating system or the like.

FIG. 13 is a flowchart showing the overall procedure of an address translation information preload process according to the second embodiment of the present invention. The processor 902 notifies the preload controller 907 of the access hint information 301 in advance (step S1301). In this case, the preload management unit 1101 in the preload controller 907 receives the access hint information 301 and stores it in the access hint information table 1102. Also, the preload controller 907 acquires the system information 1105.

Next, a pre-process of the preload process is executed (step S1302). In the pre-process of the preload process, identification of the start of the preload process, an entry addition process to the address translation information preload state table 1103, and the like are made.

After that, a continuous process of the preload process is executed (step S1303). In the continuous process of the preload process, the end of a data access is identified, and the remaining address translation information preload process is continued on the basis of the entry added to the address translation information preload state table 1103 prepared by the pre-process.

Figure 14:
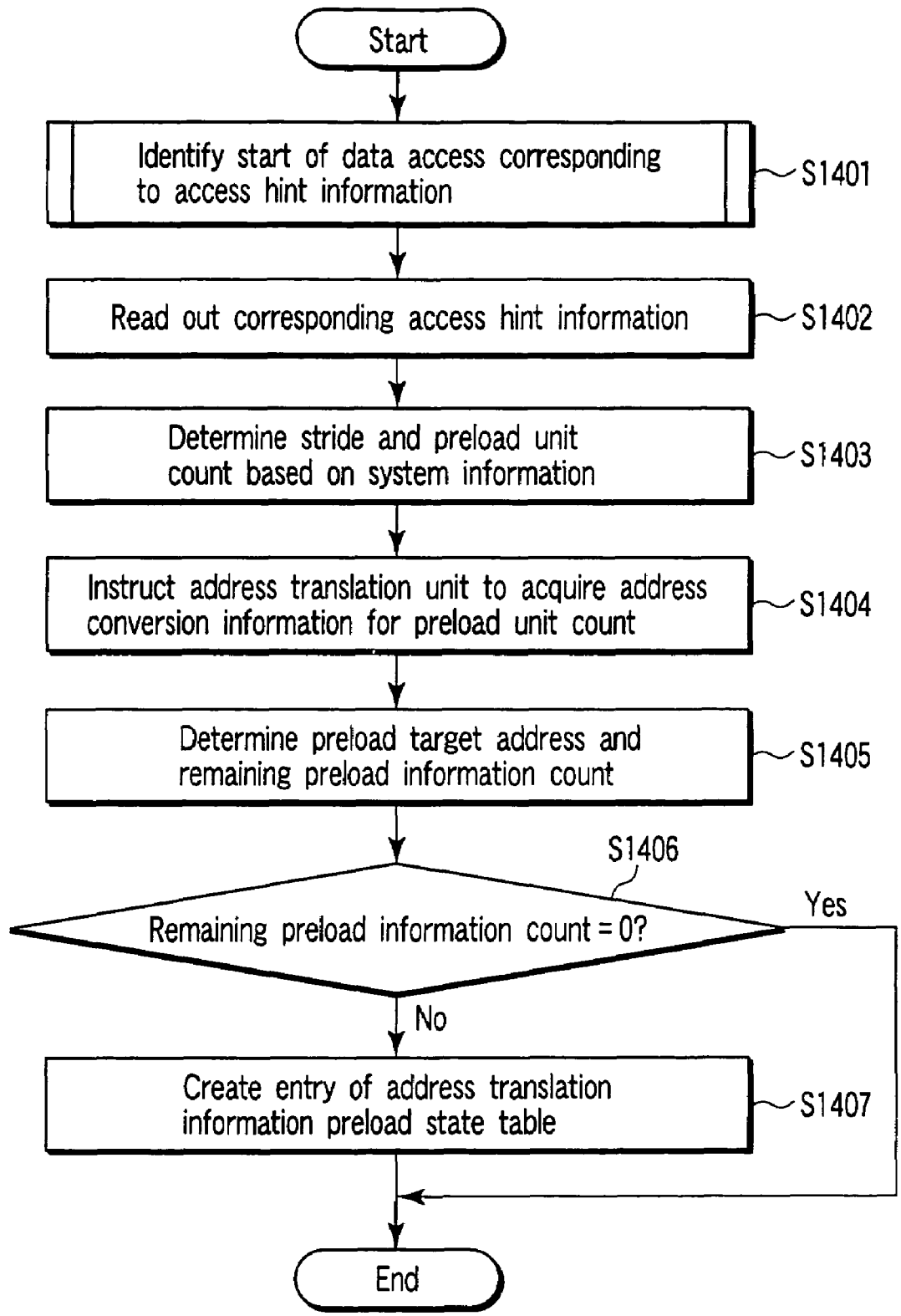
FIG. 14 is a flowchart pertaining to a pre-process of the address translation information preload process shown in FIG. 13.

FIG. 14 is a flowchart pertaining to the pre-process of the address translation information preload process shown in FIG. 13. Initially, the start of a data access corresponding to information stored in the access hint information table 1102 is identified (step S1401). To identify the data access start, the processor 902 may notify the preload controller 907 of the ID of access start information appended with the ID or start address of the access hint information. Alternatively, a data transfer instruction to the bus access unit 904 may be monitored, and when that address is equal to the start address of the access hint information table 1102, it may be identified that the corresponding access has started.

Corresponding access hint information is read out from the access hint information 1102 (step S1402). The stride and preload unit count are determined on the basis of the address translation unit, clocks of the processor 902 and the data transfer delay time of the bus access unit 904 as the system information 1105 (step S1403). After the preload unit count is determined, an address translation information acquisition instruction for the preload unit count from the start address is issued to the address translation unit 908 (step S1404).

The preload target address is calculated from the start address and stride of the corresponding access hint information in accordance with the preload unit count, and the remaining preload information count is calculated from the data access count and address translation unit (step S1405). It is checked if the remaining preload information count is zero (step S1406). If the remaining preload data count is not zero, a new entry is added to the address translation information preload state table 1103 on the basis of the calculated preload start address, stride, preload unit count, and remaining preload information count (step S1407).

Note that a practical calculation example of the stride and preload unit count will be described.

The stride is given, e.g., by:

$$\text{Stride} = \left\lceil \frac{\text{Stride of a data access}}{\text{Address translation unit}} \right\rceil \cdot \text{Address translation unit} \quad (2)$$

When the stride of a data access is smaller than the address translation unit, identical address translation information can be used in a plurality of data accesses in some cases. Hence, an interval of use of address translation information often becomes longer than the data access interval. For this purpose, an address translation information use interval is calculated.

The address translation information use interval is given, e.g., by:

$$\text{Address translation information use interval} = \quad (3)$$
$$\left\lceil \frac{\text{Address translation unit}}{\text{Stride of a data access}} \right\rceil \cdot \text{Data access interval}$$

Using the calculated value of the address translation information use interval, the preload unit count of address translation information is given, e.g., by:

$$\text{Preload unit count} = \frac{\text{Data transfer delay time}}{\text{Address translation information use time}} \quad (4)$$

As the data transfer delay time, that of the bus access unit 904 can be used. As an address translation information use time, a value obtained by dividing the address translation information use interval by clocks of the processor 902 can be used.

If a new entry is added to the address translation information preload state table 1103 in step S1407 in the pre-process of the address translation information preload process shown in FIG. 14, the continuous process of the address translation information preload process is executed.

Figure 15:
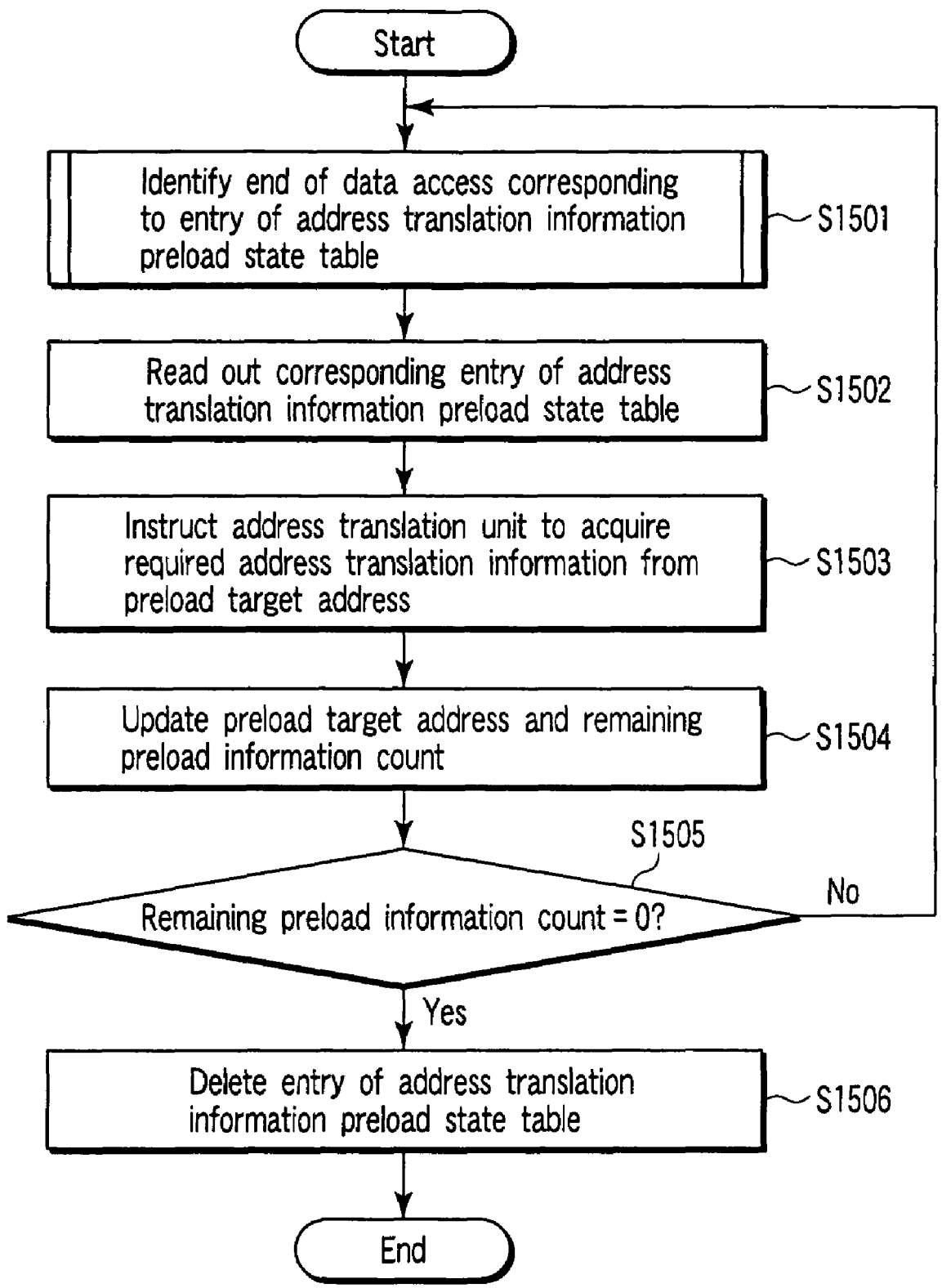
FIG. 15 is a flowchart pertaining to a continuous process of the address translation information preload process shown in FIG. 13.

FIG. 15 is a flowchart pertaining to the continuous process of the address translation information preload process in FIG. 13. Initially, the end of a data access corresponding to the entry of the address translation information preload state table is identified (step S1501).

To identify the data access end, the processor 902 may notify the preload controller 907 of access end information appended with the address of data, the access of which ends. Alternatively, a data transfer instruction from the cache 903 to the bus access unit 904 may be monitored, and when that address is equal to the address of the preload instruction, it may be identified that the corresponding access has ended.

The corresponding entry of the address translation information preload state table is read out (step S1502), and address translation information acquisition instructions for the data access end count from the preload target address of that entry are issued to the address translation unit 908 (step S1503). Subsequently, the preload target address and remaining preload information count are updated in accordance with the number of preload instructions in step S1503 (step S1504). It is checked if the remaining preload information count becomes zero as a result of updating (step S1505). If the remaining preload information count is not zero, the processes from step S1501 are repeated; otherwise, the corresponding entry of the address translation information preload state table 1103 is deleted (step S1506).

A practical method of calculating the number of preload instructions of required address translation information from the data access end count will be explained. The number of pieces of address translation information which are to undergo the preload process uses the number of pieces of address translation information which are used after the end of data accesses. The number of preload instructions of address translation information is given, e.g., by:

$$\text{Address translation information preload instruction count} = \quad (5)$$
$$\left\lceil \frac{\text{Data access end count} \cdot \text{Stride}}{\text{Address translation unit}} \right\rceil$$

In place of every data access end count, a used address translation information count may be calculated from the total of all the data end counts, and a value obtained by subtracting the used address translation information count from the preload instructed address translation information count may be used as a preload instructed address translation information count. If that count is smaller than the preload unit count, a value obtained by subtracting the preload instructed address translation information count from the preload unit count may be used as the address translation information preload instruction count.

According to the second embodiment of the present invention described above, the preload controller performs an address translation information preload process on the basis of the access hint information of data and system information, which are provided in advance, in consideration of the system performance and the like, and can allocate address translation information required by the address translation unit on the temporary memory (address translation information cache) in advance.

Third Embodiment

Figure 16:
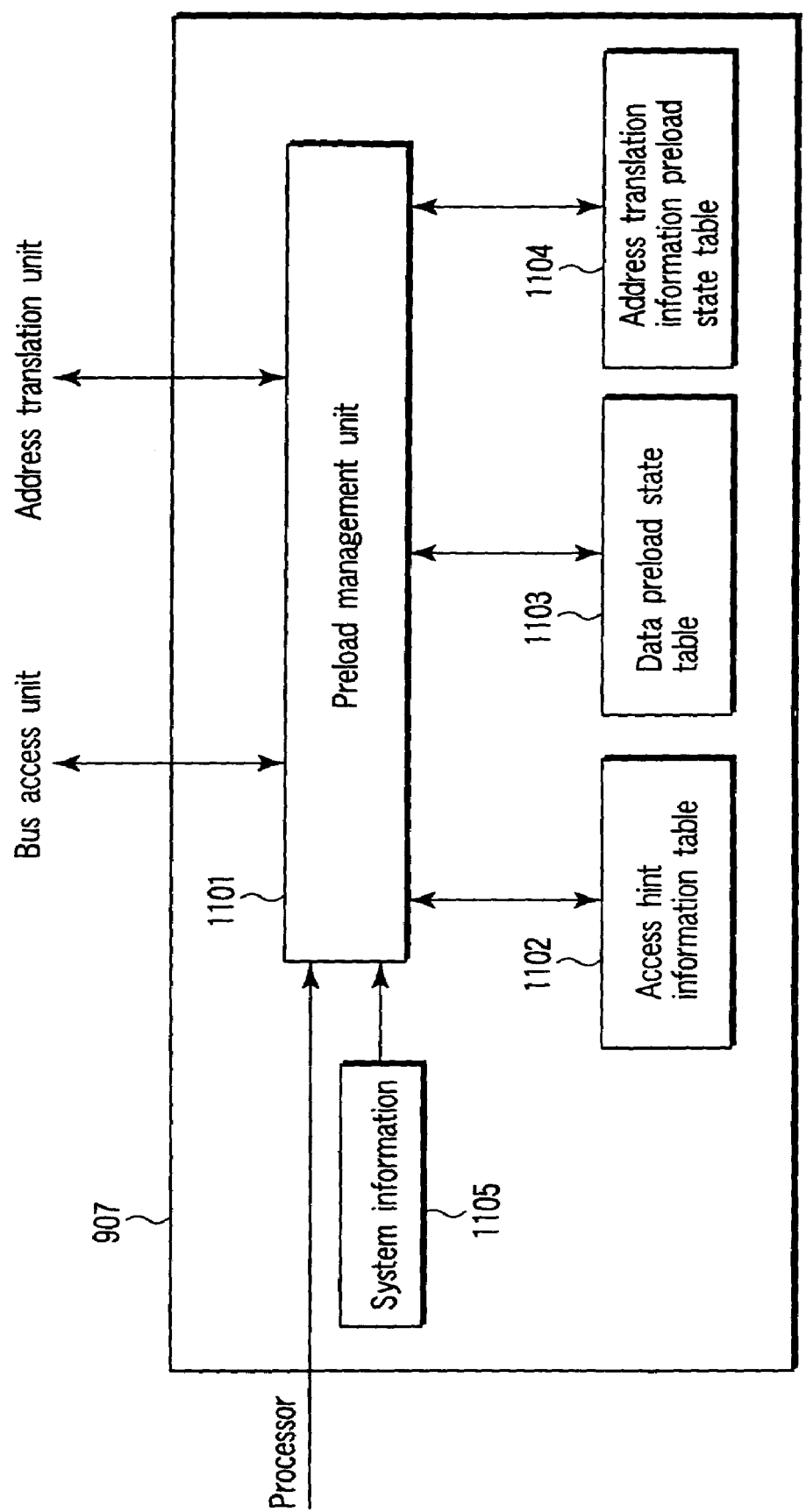
FIG. 16 is a block diagram showing a preload controller according to the third embodiment of the present invention.

FIG. 16 is a block diagram showing a preload controller according to the third embodiment of the present invention.

The computer systems shown in FIGS. 9 and 10 can execute the data preload process simultaneously with the address translation information preload process. The third embodiment shows an example of the internal arrangement of the preload controller 907 (1007) applied in such case.

As shown in FIG. 16, both-a data preload state table 1103 and address translation information preload state table 1104 are provided to a preload management unit 1101. As access hint information and an access hint information table 1102, the same ones as the access hint information 301 and access hint information table 202 described in the first embodiment are used.

When the preload controller is as configured as shown in FIG. 16, the data preload process described in the first embodiment and the address translation information preload process described in the second embodiment can be simultaneously implemented.

Fourth Embodiment

Figure 17:
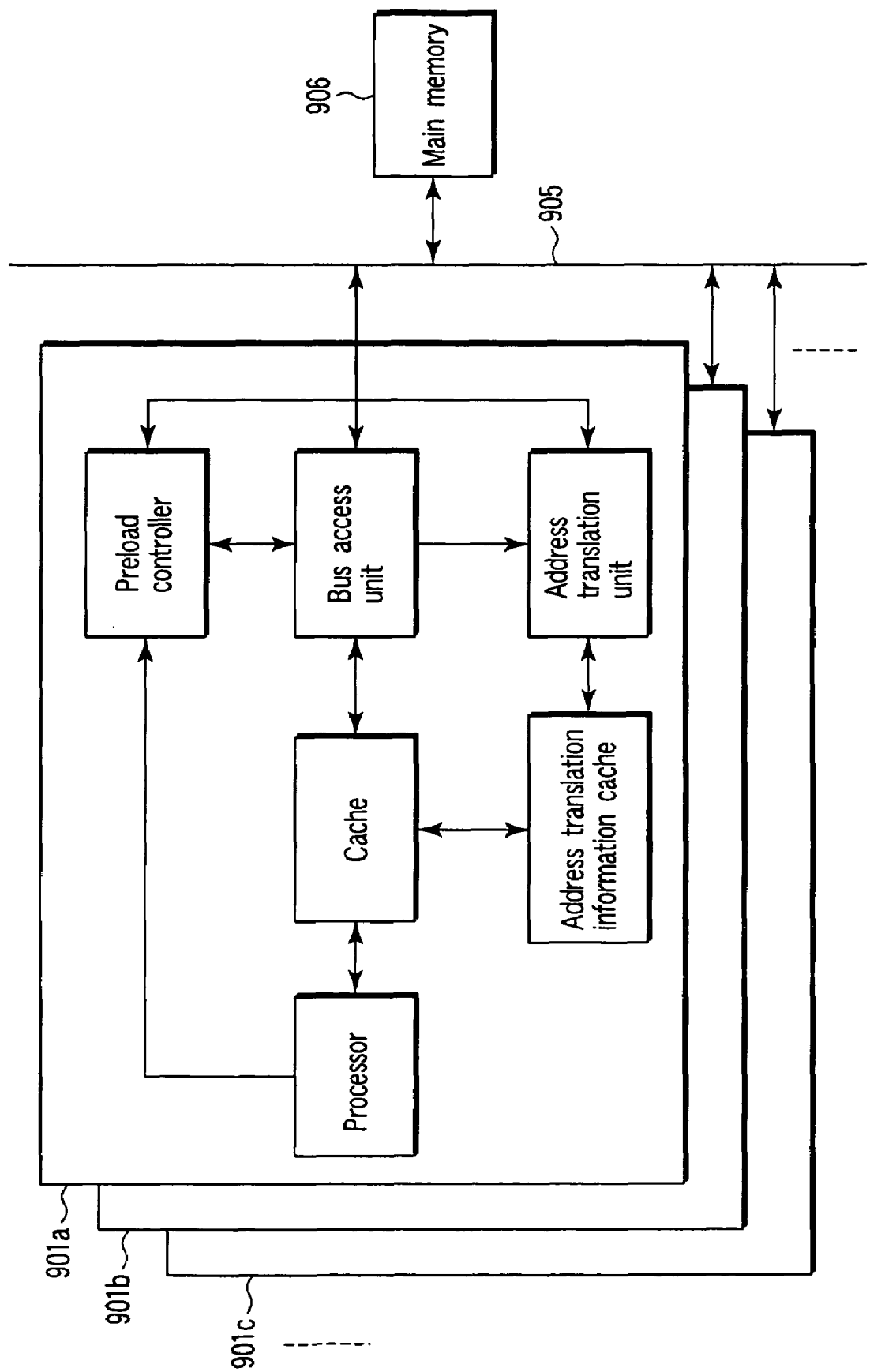
FIG. 17 is a block diagram showing a computer system according to the fourth embodiment of the present invention.

FIG. 17 is a block diagram showing a computer system according to the fourth embodiment of the present invention. As shown in FIG. 17, the computer system according to this embodiment has a plurality of processor units 901a, 901b, 901c, . . . connected to a main memory 906 via a bus 905. In FIG. 17, each processor unit has the same arrangement as the computer system 901 described in the second embodiment. Also, an arrangement which does not include an address translation unit and the like but includes only a data cache is available.

According to the computer system of the fourth embodiment, the present invention can be independently embodied for each processor unit, and the advantage of the present invention is enhanced with increasing the number of processor units.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processor for controlling a bus access device that reads out data from a main memory via a bus and for transferring the readout data to a temporary memory, comprising:
   a first acquiring device configured to acquire access hint information which represents a start address and a data access interval to the main memory, wherein the acquired access hint information is acquired from an outside device;
   a second acquiring device configured to acquire system information which represents a transfer delay time in transfer of data via the bus by the bus access device;
   an identifying device configured to monitor a data transfer instruction to the bus access device and to identify data access of the data when an address of the data transfer instruction is equal to the start address of the access hint information;
   a determining device configured to determine a preload unit count based on the data access interval represented by the access hint information and the transfer delay time represented by the system information, the preload unit count being the transfer delay time divided by a data access time, the data access time including at least one of:
     the data access interval divided by a clock speed of the processor;
     a first estimated time based on a behavior of the processor obtained from a command sequence to be executed during the data access; or
     a second estimated time calculated by multiplying a number of commands included in the command sequence and an average processing time; and
   a first management device configured to instruct the bus access device to read out data for the preload unit count from the main memory and to transfer the readout data to the temporary memory ahead of the data access of the data.

2. A processor according to claim 1, wherein the temporary memory includes a data cache.

3. A processor according to claim 1, further comprising:
   an address translation information cache configured to store address translation information;
   an address translation unit configured to translate an address of the data on the basis of the address translation information; and
   a second management device configured to instruct the bus access device or the address translation unit to read out address translation information for the preload unit count from the main memory and to transfer the readout address translation information to the address translation information cache ahead of address translation using the address translation information.

4. A processor for controlling an address translation device which is connected to a main memory via a bus, reading out address translation information from the main memory via the bus, and transferring the readout address translation information to a temporary memory, comprising:
   a first acquiring device configured to acquire access hint information which represents a start address and a data access interval to the main memory, wherein the acquired access hint information is acquired from an outside device;
   a second acquiring device configured to acquire system information which represents a transfer delay time in transfer of address translation information via the bus by the address translation device;
   an identifying device configured to monitor an address translation instruction to the address translation device and to identify address translation using the address translation information when an address of the address translation instruction is equal to the start address of the access hint information;
   a determining device configured to determine a preload unit count on the basis of the data access interval represented by the access hint information and the transfer delay time represented by the system information, the preload unit count being the transfer delay time divided by a data access time, the data access time including at least one of:
     the data access interval divided by a clock speed of the processor;
     a first estimated time based on a behavior of the processor obtained from a command sequence to be executed during a data access; or
     a second estimated time calculated by multiplying a number of commands included in the command sequence and an average processing time; and
   a first management device configured to instruct the address translation device to read out address translation information for the preload unit count from the main memory and to transfer the readout address translation information to the temporary memory ahead of the address translation using the address translation information.

5. A processor according to claim 4, wherein the temporary memory includes an address translation information cache.

6. A processor according to claim 4, further comprising:
   a data cache for storing data;
   a bus access device configured to read out the data from the main memory via the bus, and transfer the readout data to the data cache; and
   a second management device configured to instruct the bus access device to read out data for the preload unit count from the main memory and to transfer the readout data to the data cache ahead of a data access of the data.

7. A preload control method for issuing a data preload instruction to a bus access device which is connected to a main memory via a bus, reading out data from the main memory via the bus, and transferring the readout data to a temporary memory, comprising:
   acquiring access hint information which represents a start address and a data access interval to the main memory, wherein the acquired access hint information is acquired from a processor;
   acquiring system information which represents a transfer delay time in transfer of data via the bus by the bus access device;
   monitoring a data transfer instruction to the bus access device and identifying data access of the data when an address of the data transfer instruction is equal to the start address of the access hint information;
   determining a preload unit count on the basis of the data access interval represented by the access hint information and the transfer delay time represented by the system information, the preload unit count being the transfer delay time divided by a data access time, the data access time including at least one of:
      the data access interval divided by a clock speed of the processor;
      a first estimated time based on a behavior of the processor obtained from a command sequence to be executed during the data access; or
      a second estimated time calculated by multiplying a number of commands included in the command sequence and an average processing time; and
   instructing the bus access device to read out data for the preload unit count from the main memory and to transfer the readout data to the temporary memory ahead of the data access of the data.

8. A method according to claim 7, wherein the temporary memory includes a data cache.

9. A method according to claim 7, further comprising:
   translating an address of the data on the basis of the address translation information; and
   instructing the bus access device to read out address translation information for the preload unit count from the main memory and to transfer the readout address translation information to an address translation information cache ahead of address translation using the address translation information.

10. A preload control method for issuing a preload instruction of address translation information to an address translation device which is connected to a main memory via a bus, reading out address translation information from the main memory via the bus, and transferring the readout address translation information to a temporary memory, comprising:
   acquiring access hint information which represents a start address and a data access interval to the main memory, wherein the acquired access hint information is acquired from a processor;
   acquiring system information which represents a transfer delay time in transfer of address translation information via the bus by the address translation device;
   monitoring an address translation instruction to the address translation device and identifying address translation using the address translation information when an address of the address translation instruction is equal to the start address of the access hint information;
   determining a preload unit count on the basis of the data access interval represented by the access hint information and the transfer delay time represented by the system information, the preload unit count being the transfer delay time divided by a data access time, the data access time including at least one of:
      the data access interval divided by a clock speed of the processor;
      a first estimated time based on a behavior of the processor obtained from a command sequence to be executed during a data access; or
      a second estimated time calculated by multiplying a number of commands included in the command sequence and an average processing time; and
   instructing the address translation device to read out address translation information for the preload unit count from the main memory and to transfer the readout address translation information to the temporary memory ahead of the address translation using the address translation information.

11. A method according to claim 10, wherein the temporary memory includes an address translation information cache.

12. A method according to claim 10, further comprising instructing a bus access device to read out data for the preload unit count from the main memory and to transfer the readout data to the data cache ahead of a data access of the data.

13. A computer readable medium storing a program for controlling a bus access device which is connected to a main memory via a bus, reading out data from the main memory via the bus, and transferring the readout data to a temporary memory, the program comprising:
   means for instructing a computer to acquire access hint information which represents a start address and a data access interval to the main memory, wherein the acquired access hint information is acquired from a processor;
   means for instructing the computer to acquire system information which represents a transfer delay time in transfer of data via the bus by the bus access device;
   means for instructing the computer to monitor a data transfer instruction to the bus access device and for identifying data access of the data when an address of the data transfer instruction is equal to the start address of the access hint information;
   means for instructing the computer to determine a preload unit count on the basis of the data access interval represented by the access hint information and the transfer delay time represented by the system information, the preload unit count being the transfer delay time divided by a data access time, the data access time including at least one of:
      the data access interval divided by a clock speed of the processor;
      a first estimated time based on a behavior of the processor obtained from a command sequence to be executed during the data access; or
      a second estimated time calculated by multiplying a number of commands included in the command sequence and an average processing time; and
   means for instructing the computer to instruct the bus access device to read out data for the preload unit count from the main memory and to transfer the readout data to the temporary memory ahead of the data access of the data.

14. A computer readable medium storing a program for controlling an address translation device which is connected to a main memory via a bus, reading out address translation information from the main memory via the bus, and transferring the readout address translation information to a temporary memory, the program comprising:
- means for instructing a computer to acquire access hint information which represents a start address and a data access interval to the main memory, wherein the acquired access hint information is acquired from a processor;
- means for instructing the computer to acquire system information which represents a transfer delay time in transfer of address translation information via the bus by the address translation device;
- means for instructing the computer to monitor an address translation instruction to the address translation device and for identifying address translation using the address translation information when an address of the address translation instruction is equal to the start address of the access hint information;
- means for instructing the computer to determine a preload unit count on the basis of the data access interval represented by the access hint information and the transfer delay time represented by the system information, the preload unit count being the transfer delay time divided by a data access time, the data access time including at least one of:
  - the data access interval divided by a clock speed of the processor;
  - a first estimated time based on a behavior of the processor obtained from the command sequence to be executed during a data access; or
  - a second estimated time calculated by multiplying a number of commands included in a command sequence and an average processing time; and
- means for instructing the computer to instruct the address translation device to read out address translation information for the preload unit count from the main memory and to transfer the readout address translation information to the temporary memory ahead of the address translation using the address translation information.

15. A computer system comprising:
a main memory;
a temporary memory;
a bus;
a bus access device that reads out data from the main memory via the bus and transfers the readout data to the temporary memory;
a preload controller that controls the bus access device, including:
a first acquiring device configured to acquire access hint information which represents a start address and a data access interval to the main memory, wherein the acquired access hint information is acquired from a processor;
a second acquiring device configured to acquire system information which represents a transfer delay time in transfer of data via the bus by the bus access device;
an identifying device configured to monitor a data transfer instruction to the bus access device and to identify data access of the data when an address of the data transfer instruction is equal to the start address of the access hint information;
a determining device configured to determine a preload unit count based on the data access interval represented by the access hint information and the transfer delay time represented by the system information, the preload unit count being the transfer delay time divided by a data access time, the data access time including at least one of:
  the data access interval divided by a clock speed of the processor;
  a first estimated time based on a behavior of the processor obtained from a command sequence to be executed during the data access; or
  a second estimated time calculated by multiplying a number of commands included in the command sequence and an average processing time; and
a first management device configured to instruct the bus access device to read out data for the preload unit count from the main memory and to transfer the readout data to the temporary memory ahead of the data access of the data.

16. A bus system comprising:
a bus access device that reads out data from a main memory via a bus and transfers the readout data to a temporary memory; and
a preload controller that controls the bus access device, including:
a first acquiring device configured to acquire access hint information which represents a start address and a data access interval to the main memory, wherein the acquired access hint information is acquired from a processor;
a second acquiring device configured to acquire system information which represents a transfer delay time in transfer of data via the bus by the bus access device;
an identifying device configured to monitor a data transfer instruction to the bus access device and to identify data access of the data when an address of the data transfer instruction is equal to the start address of the access hint information;
a determining device configured to determine a preload unit count based on the data access interval represented by the access hint information and the transfer delay time represented by the system information, the preload unit count being the transfer delay time divided by a data access time, the data access time including at least one of:
  the data access interval divided by a clock speed of the processor;
  a first estimated time based on a behavior of the processor obtained from a command sequence to be executed during the data access; or
  a second estimated time calculated by multiplying a number of commands included in the command sequence and an average processing time; and
a first management device configured to instruct the bus access device to read out data for the preload unit count from the main memory and to transfer the readout data to the temporary memory ahead of the data access of the data.

* * * * *